Patented Nov. 9, 1943

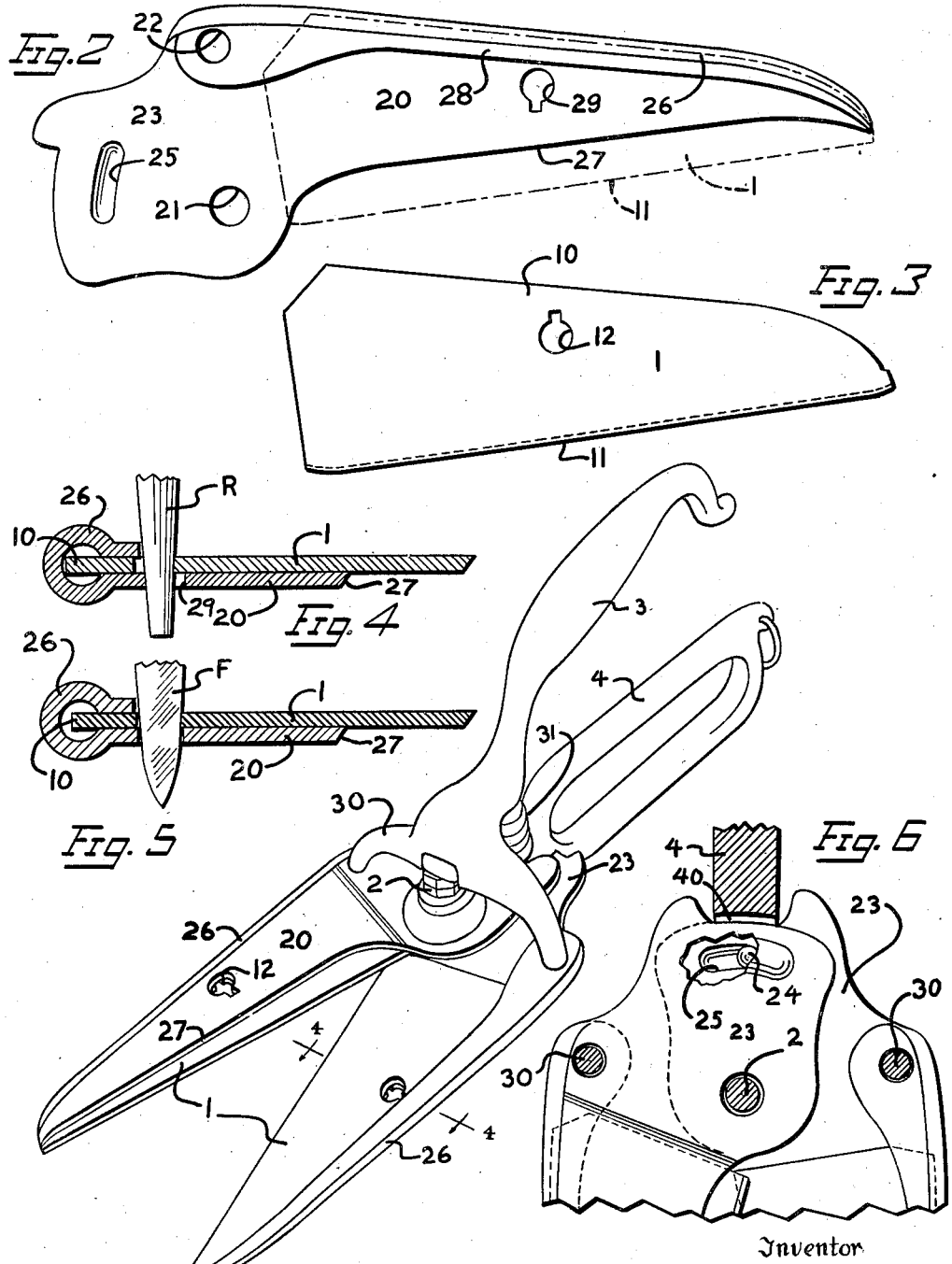

2,333,740

UNITED STATES PATENT OFFICE 2,333,740

REMOVABLE BLADE SHEARS

Edward L. Rasmussen, near Seattle, Wash.

Application May 11, 1943, Serial No. 486,496

12 Claims. (Cl. 30—260)

This invention relates to a removable blade construction for shears and similar instruments, and is particularly useful in shears such as used for grass cutting, pruning, and similar purposes.

The most effective cutting region of shears is that nearest the pivot interconnecting the shear blades, because the greatest leverage is available on such blade portions and usually they operate in the best shearing contact. Consequently such blade portions are used to a greater extent than portions farther toward the blade tips. As a result such root blade portions become dull more quickly, and yet, because of their overlapping relationship access to these parts of the blades for sharpening purposes is the most difficult.

It is therefore a principal object of my invention to provide a blade construction for shears which affords access to the cutting edges of the blades throughout their entire length so that they can be sharpened easily, and in particular this object is accomplished by enabling the portions of the blades including the cutting edges to be separated from the rest of the blade assembly for sharpening purposes. Such portion of each blade may be removed independently of that of the other blade and without requiring that the pivoted portions of the blade structure be disassembled, although the removable blade portions will be held securely in place while the shears are being used for normal cutting operations.

An additional object is to enable a removable shear blade holder to stiffen and hold the blade securely for effective operation in use, but to be fabricated economically from a minimum quantity of material.

In particular it is an object of my shears construction to facilitate setting of the removable blades accurately and securely in their respective blade holders, so that they will cooperate properly during use of the shears, and yet to permit the blades to be expelled positively, quickly and easily from their holders when it is desired to remove them for sharpening or replacement purposes.

Other advantages of my invention which are obtained by the more specific structural features of my removable blade and blade holding mechanism will be understood from the following particular description of a representative embodiment of my invention. For illustrative purposes my removable blade construction has been shown as incorporated in shears primarily intended for grass cutting, but it will be understood that shears of this general type may be used for other purposes, and the principles of my invention may be adapted to shears of quite different construction.

Figure 1 is a top perspective view of grass shears incorporating my removable blade structure.

Figure 2 is a top plan view of one blade holder separate from the shears assembly illustrated in Figure 1, and Figure 3 is a top plan view of the blade itself removed from the holder of Figure 2.

Figure 4 is a cross sectional view taken on the line 4—4 of Figure 1, showing the application of a blade inserting tool to the removable blade and blade holder. Figure 5 is a cross sectional view similar to Figure 4, but illustrating the application of a different blade inserting and removing tool to the blade and holder assembly.

Figure 6 is a fragmentary transverse sectional view taken in a horizontal plane above the pivoted ends of the blades, showing parts broken away.

Shears of the general type to which the removable blade construction of my present invention is applied in the drawing are similar to those disclosed in my Patent No. 1,941,718, issued Jan. 2, 1934. In such shears the blades 1 are oscillated about a pivot 2 which is received in apertures 21 in the blade holding plates 20 carrying the blades proper. The movable handle 3 swings relative to the fixed handle 4 in a plane perpendicular to the blades 1 and about a pivot extending transversely of pivot 2 at its upper end. A yoke 30, integral with the forward end of the handle 3, has ends turned toward the blade holders 20 approximately perpendicular to the movable handle and generally parallel to the blade pivot 2. These yoke ends are engaged in apertures 22 in the blade holders which are spaced laterally from the apertures 21 for pivot 2. A spring 31, reacting between the fixed handle 4 and movable handle 3, urges these handles apart, which draws the ends of yoke 30 toward the handle 4 to swing the blade holders 20 apart. When the handles are manually squeezed together the lower ends of the yoke 30 will be thrust forward to swing the blade holders in the direction to move the sharpened edges of the blades past each other for cutting.

The heel portions 23 of the blade holders 20 overlap, and their portions encircling the pivot apertures 21 are drawn closely together by the nuts securing the pivot in place. In order to hold the cutting edges of the blades 1 in contact these heel portions may be urged apart in a direction perpendicular to the blades and holders by a ball 24 interposed between the heel portions of the two holders and received in inwardly facing grooves 25 formed in them which are preferably somewhat arcuate, the center of such arc coinciding with the axis of the pivot 2. Not only does such ball create a wedging action to press the cutting edges of blades 1 toward each other, but it holds the heel portions 23 of the blade holders apart sufficiently so that they cannot rub against each other, thus constituting an antifriction bearing for these holders as it rolls in grooves 25.

The blade 1 itself is made of high grade steel, and can be fairly thin, since the holders 20 considerably increase the stiffness of the blades. These holders themselves can be made of relatively low grade material. In plan the blade is preferably of generally triangular shape, tapering from a wide end adjacent to the pivot 2 substantially to a point at the tip of the blade. As shown in Figures 4 and 5, the thickness of the blade is uniform throughout its width, as well as its length. The blade holder 20, which is of channel shape, forms a pocket closed at both ends for reception of the blade, and the latter is clamped in such pocket solely by friction of the sides of the channel pocket with the opposite side faces of the blade itself. Each such holder may have a cylindrical bead or roll 26 formed along its outer edge to improve the resilient pinching action of its sides and to increase its stiffness lengthwise. The blade holders are thus better able to resist bending which would permit a gap to occur between the cutting edges of the blades as they are moved progressively into overlapping relationship during a cutting operation, and which prevents effective cutting.

The sides of the channel pocket of each blade holder 20 are spaced apart sufficiently to receive between them the edge 10 of the blade 1 opposite its cutting edge 11, and the inner wall of the hollow bead 26 forms the bottom of such channel against which the blade edge 10 may abut. The sides of the channel, however, are not of equal width, the wider side being of generally triangular shape similar to that of the blade 1 and of a width approaching the blade width. When the blade is assembled in the blade holder in the position shown in broken lines in Figure 2 with its edge 10 seated on the channel bottom, therefore, the cutting edge 11 of the blade projects only slightly beyond the edge 27 of the blade holder. The narrower side of the blade holder is preferably of substantially uniform width over almost its entire length, and is quite narrow as compared to the width of the blade 1 and the wider side of the blade holder.

The width of the channel between the sides of the blade holder is no greater than the thickness of the blade 1, and may be slightly less. In the latter event the sheet metal of which the blade holder is made will be sufficiently flexible so that the channel may be spread slightly for reception of the edge of blade 1. If the channel width and blade thickness are thus proportioned, when the blade is inserted as far as possible into the channel the holder will resiliently grip the blade firmly, so that it cannot work loose from the holder during use. With the blade thus held snugly in its holder solely by the resilient clamping action of the channel sides against the opposite surfaces of the blade it is not necessary to pin together or otherwise interconnect the blade and the holder positively in any way.

When the blades are held in the blade holders purely by friction in this manner a problem arises as to how the blades may be forced fully into the blade holder channels to seat on the channel bottoms. If pressure is applied against the cutting edge of a blade for this purpose it will be dulled to a greater or less extent. Also when the blade has thus been forced as far as possible into the channel the edge of the blade projecting beyond the edge 27 of the wider channel side is insufficient to afford a firm grip for withdrawing the blade edgewise from the holder. Moreover, it is difficult to grasp a thin, smooth blade firmly, and particularly without risk of bending it or injuring its cutting edge.

To enable the blade to be inserted into and removed from the holder quickly and easily I provide a keyhole shaped aperture 29 in each blade holder, and a complemental keyhole aperture 12 in each blade. The circular portions of these complemental apertures 12 and 29 are of substantially the same size, and they are located relative to the blade and blade holder, respectively, so that when the blade edge 10 is seated in the channel bottom of holder 20, and the blade is in proper disposition lengthwise of the holder, the circular portions of the two apertures will preferably be exactly in registry, as shown in Figure 4. With the parts in this position the notches of the apertures 12 and 29 will be disposed transversely of the blade and blade holder, the notch of the of the blade aperture 12 extending toward the bottom of the blade holder channel and that of the blade holder aperture 29 being directed away from the channel bottom, so that such two notches are substantially aligned in a direction transversely of the blade and blade holder, although disposed at opposite sides of the circular portions of the apertures.

When a blade 1 is to be inserted into its blade holder 20 the blade edge 10 is started slightly into the channel, with the blade and holder being disposed in such relationship lengthwise that the apertures 12 and 29 are approximately aligned transversely of the blade and holder. If the circular portions of the two apertures do not overlap at all, certainly the two notches can be brought into at least partial coincidence by very slight pressure applied edgewise to the blade. Now a flat tapered tool, designated T in Figure 5, which preferably comes to a point, may be inserted through the overlapping portions of the notches of apertures 12 and 29. By driving this tool downward the blade 1 is wedged edgewise into the channel to the position of Figure 5, although the force to move the blade and holder into such relative position should not be very great.

With the blade and blade holder thus disposed the circular portion of apertures 12 and 29 will overlap to a considerable extent. A round tapered tool R, such as a nail set, for example, is now inserted through the apertures and driven downward to the position shown in Figure 4. This operation will move the circular portions of apertures 12 and 29 toward registry, simultaneously wedging the blade edgewise so that its edge 10 seats on the bottom of the blade holder channel. When these parts are thus brought into abutment the circular parts of the apertures should be in registry to indicate that the blade is held accurately in cutting position by the holder. Preferably this last portion of the blade's movement into the blade holder requires considerably greater force than the movement up to this stage, so that the blade will be clamped firmly between the two sides of the blade holder as explained above.

During use it is probable that the accumulation of dirt and other foreign material between the blade and the sides of the blade holder will tend to make the blade stick in place, so that it would be very difficult to remove it by a straight pull. With my arrangement, however, it is again merely necessary to insert into the registering circular portions of apertures 12 and 29 the tapered flat tool F of Figure 5, and to drive it downward. Reacting between the curved edges of the apertures 12 and 29 opposite their notches the tool will wedge the blade out of the channel, as illustrated in Figure 5, until it binds between the notched and circular portions of the blade aperture 12. This action will move the blade outward of the holder sufficiently so that the same tool may be inserted between the tip of the blade edge 10 and at least the edge 28 of the narrower blade holder side. It may then be manipulated to pry the outer end of the blade to remove it completely from the holder.

It will be noted that the blade holders, interconnected by the pivot 2, are identical, and that their narrow sides overlie those faces of the blades which overlap during a cutting operation. The edges 28 of such narrow blade holder sides are set back sufficiently to afford plenty of clearance for movement of the cutting edge of the opposite blade. By making the side of the channel holder engaging one side of each blade relatively wide, the thin blade is adequately supported both lengthwise and transversely. Also while I have shown the blades to be of identical, generally triangular shape, other shapes may be more suitable for shears of some types.

Although both apertures 12 and 29 are preferably of keyhole shape, it will be understood that complemental apertures of other shape could be used. Thus, for example, two parallel slots could be provided in each blade and blade holder, extending transversely of them in such location that one pair of overlapping slots could be wedged toward registry by a tool F to press the blade fully into the blade holder, while the other pair of slots could be forced toward registry to start movement of the blade out of the holder. Alternatively two pairs of circular apertures to receive a tool R would serve the same purpose.

Various other departures from the preferred embodiment of my invention shown may also be made by those skilled in the art while still utilizing its salient features as defined in the appended claims. Whatever shape is used it is very desirable that the blade and holder apertures, or parts thereof, be of the same shape and approximately the same size, so that when the blade is properly seated in the holder the registry of the apertures will afford a reliable indication that the blade is adjusted accurately both laterally and lengthwise of the holder for cutting operation. It will then be held firmly in such position without requiring bolts, pins or other securing elements which might become loose and allow the blades to move out of their proper cutting relationships.

What I claim as my invention is:

1. A cutting implement comprising a blade holder of channel shape, a blade having an edge adapted to be inserted in the blade holder channel, said blade and blade holder both having apertures therein, portions of which are adapted to be moved toward registry coincident with movement of said blade farther into the channel of said blade holder by a force reacting between an edge of one such aperture in one of said members and the opposite edge of the other aperture.

2. A cutting implement comprising a blade holder of channel shape, a blade having an edge adapted to be inserted in the blade holder channel, said blade and holder both having apertures therein of keyhole shape, the circular portions of which apertures are adapted to be moved toward registry coincident with movement of said blade farther into the channel of said blade holder by a force reacting between the edges of the circular portions of such apertures, and the notches of such apertures extending in opposite directions transversely of the blade and blade holder for movement toward registry by insertion of a flat tool through such apertures coincident with movement of the blade outward of its blade holder.

3. A cutting implement comprising a blade, a blade holder having a channel blade receiving pocket closed at both ends and including a narrow side of substantially uniform width throughout the major portion of its length, and a wide side for only slight projection therebeyond of the cutting edge of a blade having its opposite edge seated in the bottom of said channel pocket, said blade and the wider side of its blade holder pocket having apertures therein, portions of which are adapted to be moved toward registry coincident with movement of said blade farther into the blade holder pocket by a force reacting between an edge of one such aperture and the opposite edge of the other aperture.

4. A cutting implement comprising a blade, a blade holder having a channel blade receiving pocket closed at both ends and having the bottom of its channel formed with a tubular edge to stiffen the blade holder lengthwise and to press the sides of the channel toward each other, such channel pocket portion of said blade holder including a narrow side of substantially uniform width throughout the major portion of its length, and a wide side for only slight projection therebeyond of the cutting edge of a blade having its opposite edge seated in the bottom of said channel pocket, said blade and the wider side of its blade holder pocket having apertures therein of keyhole shape, the circular portions of which apertures are adapted to be moved toward registry coincident with movement of said blade farther into the pocket of said blade holder by a force reacting between the edges of the circular portions of such apertures, and the notches of such apertures extending in opposite directions transversely of the blade holder for movement toward registry by insertion of a flat tool through such apertures coincident with movement of the blades outward of its blade holder pocket.

5. Shears comprising two blade holders, a pivot interconnecting said blade holders near one end, each blade holder including a channel blade receiving portion extending from a location adjacent to said pivot toward the end of the blade holder remote from said pivot, and two blades each having its edge opposite its cutting edge received in the channeled portion of its blade holder, and retained therein solely by the frictional clamping engagement of the blade holder thereon, to dispose the cutting edges of the blades in overlapping relationship.

6. Shears comprising two blade holders, a pivot interconnecting said blade holders, said blade holders being formed of channel shape and opening toward each other, and each having the bottom of its channel formed as a tubular edge to stiffen the blade holder lengthwise; and to press the sides of the channels toward each other; and cooperating blades each held in one of said channel holders solely by clamping of the sides of said holder against opposite faces of the blade.

7. Shears comprising two blade holders, a pivot interconnecting such blade holders, each such blade holder having a channel blade-receiving pocket closed at both ends, and a blade removably received in each such pocket, each blade projecting from its pocket sufficiently for its cutting edge to move into overlapping relationship with the cutting edge of the other blade by swinging said blade holders about their interconnecting pivot during a cutting operation.

8. Shears comprising two blades adapted to be disposed with their cutting edges in overlapping relationship, two blade holders each having a portion adapted for engagement with the face of a blade remote from the other blade when the cutting edges of the blades are thus disposed in overlapping relationship, said blade holder portions being of a width for only slight projection therebeyond of the cutting edge of the blade engaged thereby, means holding each blade to its respective blade holder, and a pivot interconnecting said blade holders for swinging thereof to move the cutting edges of the blades into and out of overlapping relationship during a cutting operation.

9. Shears comprising two blades adapted to be disposed with their cutting edges in overlapping relationship, two blade holders each having a channel blade receiving pocket closed at both ends, the side of said channel blade receiving pocket adapted for engagement with the face of a blade remote from the other blade when the cutting edges of the blades are thus disposed in overlapping relationship being of a width for only slight projection therebeyond of the cutting edge of the blade engaged thereby; and a pivot interconnecting said blade holders for swinging thereof to move the cutting edges of the blades into and out of overlapping relationship during a cutting operation.

10. Shears comprising two identical blade holders, a pivot interconnecting said blade holders near one end, each blade holder including a channeled blade receiving portion extending from a location adjacent to said pivot to the end of the blade holder remote from said pivot, and including a narrow side of substantially uniform width throughout the major portion of its length and a relatively wide side of generally triangular shape; and two identical blades of generally triangular shape, each having its edge opposite its cutting edge received in the channeled portion of its blade holder and retained therein solely by the frictional clamping engagement of the blade holder thereon.

11. Shears comprising two generally triangular blades adapted to be disposed with their cutting edges in overlapping relationship, two blade holders each having a channel blade receiving pocket closed at both ends, one side of each said pocket adapted for engagement with the face of a blade remote from the other blade when the cutting edges of the blades are thus disposed in overlapping relationship, being of triangular shape and of a width for only slight projection therebeyond of the cutting edge of the blade engaged thereby; the other side of such channel pocket being relatively narrow and of substantially uniform width throughout the major portion of its length; and a pivot interconnecting said blade holders for swinging thereof to move the cutting edges of the blades into and out of overlapping relationship during a cutting operation.

12. Shears comprising two identical blades adapted to be disposed with their cutting edges in overlapping relationship, two identical holders for said blades, respectively, and a pivot interconnecting said blade holders near one end, each blade holder having a channel blade-receiving pocket closed at both ends extending from a location adjacent to said pivot to the end of the blade holder remote from said pivot, and each having the bottom of its channel formed as a tubular edge to stiffen the blade holder lengthwise and to press the sides of the channel toward each other, such channel pocket portion of each blade holder including a narrow side of substantially uniform width throughout the major portion of its length, and a wide side for only slight projection therebeyond of the cutting edge of a blade having its opposite edge seated in the bottom of such channel pocket; each blade and the wider side of its blade holder pocket having apertures therein of keyhole shape, the circular portions of which apertures are adapted to be moved toward registry coincident with movement of such blade farther into the pocket of its blade holder by a force reacting between the edges of the circular portions of such apertures, and the notches of such apertures extending in opposite directions transversely of the blade and blade holder for movement toward registry, by insertion of a flat tool through such apertures coincident with movement of the blade outward of its blade holder pocket.

EDWARD L. RASMUSSEN.

CERTIFICATE OF CORRECTION.

Patent No. 2,333,740. November 9, 1943.

EDWARD L. RASMUSSEN.

It is hereby certified that error appears in the printed specification of the above numbered patent requiring correction as follows: Page 3, second column, line 59, claim 4, for "blades" read --blade--; page 4, first column, line 39, claim 9, for "on" read --in--; and that the said Letters Patent should be read with this correction therein that the same may conform to the record of the case in the Patent Office.

Signed and sealed this 25th day of January, A. D. 1944.

(Seal)

Henry Van Arsdale,
Acting Commissioner of Patents.